United States Patent [19]

Mongeau et al.

[11] Patent Number: 5,075,125

[45] Date of Patent: Dec. 24, 1991

[54] PROCESS FOR MANUFACTURING LOW CALORIE BUTTER AND BUTTER SUBSTITUTES

[75] Inventors: Gerald Mongeau, Sherbrooke; Philippe Bergeron, Bromptonville, both of Canada

[73] Assignee: Investissements Mongeau Inc., Quebec, Canada

[21] Appl. No.: 184,186

[22] Filed: Apr. 21, 1988

[30] Foreign Application Priority Data

Apr. 21, 1987 [CA] Canada ................................ 535237

[51] Int. Cl.$^5$ .......................... A23C 15/16; A23D 7/00
[52] U.S. Cl. ................................... 426/581; 426/518; 426/603
[58] Field of Search ............... 426/581, 585, 586, 602, 426/603, 604, 611, 518; 241/15, 92, 93

[56] References Cited

U.S. PATENT DOCUMENTS

| | | | |
|---|---|---|---|
| 2,513,035 | 6/1950 | Lopata | 366/205 |
| 3,889,005 | 6/1975 | Brammer et al. | 426/585 |
| 3,982,025 | 9/1976 | Hashimoto et al. | 426/602 |
| 4,000,332 | 12/1976 | Strinning et al. | 426/585 |
| 4,273,790 | 6/1981 | Bosco et al. | 426/604 |
| 4,443,487 | 4/1984 | Darling | 426/604 |
| 4,540,593 | 9/1985 | Moran et al. | 426/604 |
| 4,744,998 | 5/1988 | van Gennip et al. | 426/582 |
| 4,978,553 | 12/1990 | Silver | 426/581 |

FOREIGN PATENT DOCUMENTS

| | | | |
|---|---|---|---|
| 1105316 | 7/1981 | Canada | 99/159 |
| 1168923 | 6/1984 | Canada | 99/160 |
| 1176099 | 10/1984 | Canada | 99/159 |
| 1184422 | 3/1985 | Canada | 99/159 |
| 1186175 | 4/1985 | Canada | 99/165 |

*Primary Examiner*—Marianne Cintins
*Assistant Examiner*—Helen Pratt
*Attorney, Agent, or Firm*—Fisher, Christen & Sabol

[57] ABSTRACT

This invention relates to a process for continuous or churned manufacturing of low calorie butter or a low calorie butter substitute and/or a mixture thereof.

The low calorie butter and the low calorie butter substitutes, or mixtures thereof, are made with new equipment or modified equipment used in the manufacture of conventional butter and butter substitutes.

18 Claims, No Drawings

PROCESS FOR MANUFACTURING LOW CALORIE BUTTER AND BUTTER SUBSTITUTES

A process for manufacturing a low calorie butter substitute is already known, described by Reissmann and Milo (Canadian Patent No. 1,168,923), in which a gelling agent is added in the aqueous phase to increase the stability of the product which tends to reduce when milk proteins or other vegetable proteins are added.

The gelling agents used are dextrins and alginates having dextrose equivalents lower than 20 and a degree of esterification of at least 48%. Unfortunately, this substitute does not have acceptable palatability characteristics for a low calorie butter substitute. Moreover, the cost of gelling agents makes their use less interesting.

Another known manufacturing process, described in Canadian Patent No. 1,176,099, in which the inventors use a fat phase having a solid fat content exceeding 40% at 10° C., dimensions not exceeding 6 microns, as well as emulsifiers having high melting points. The recommended manufacturing methods are extremely complex and difficult to carry out in known industrial settings. Moreover, due to the use of high melting points, the palatability is undesirable.

Moran and Sharp (Canadian Patent No. 1,186,175) also worked out a process for manufacturing a spread by preparing, first of all, a cream comprising water, a stabilizing protein and oil to which they add an appropriate amount of oil (same type of oil which is used in the cream) and in manufacturing conditions assuring the formation of very fine oil droplets having diameters less than 20 µm. This process demands a precise execution which is extremely difficult to maintain on an industrial production line.

For their part, Wallgren and Nilsson (Canadian Patent No. 1,105,316) put the emphasis on a protein content of about 20 to 24% of the aqueous phase, randering the final product too expensive to make it commercially interesting.

Another manufacturing process described in Canadian Patent No. 1,184,422, is based on the thermal fractionation of palm oil having a unique composition of triglycerides. Use of palm oil in Canada has decreased considerably, making it very difficult to obtain supplies. Moreover, the thermal fractionation of large quantities of vegetable fat or butter proves to be very expensive and gives byproducts which can be very difficult to use.

Very little research has been conducted on low calorie butter due to the particular crystallization of butter fat, making any incorporation of water very difficult.

The present invention, therefore, is trying to eliminate the described problems in the previously obtained products and which are due, to a great extent, to the use of ingredients having high melting points, giving undesirable organoleptic characteristics, and the lack of equipment capable of mechanically forming a stable emulsion.

The present invention includes the following four distinct manufacturing methods, based on a mechanical and/or chemical emulsification principle of these new products.

1) Manufacturing of churned low calorie butter.
2) Manufacturing of continuous low calorie butter.
3) Manufacturing of churned low calorie butter substitutes.
4) Manufacturing of continuous low calorie butter substitutes.

The new processes for manufacturing these products, therefore, include modifying or abolishing certain conventional manufacturing steps, adding new ingredients, adding new manufacturing steps as well as modified manufacturing equipment.

In order to facilitate the description of these new processes, we are going to enumerate the various manufacturing steps for each of the above-mentioned four methods.

1) Method for manufacturing churned low calorie butter

The present invention starts with the known method for manufacturing churned butter:

Step 1: Pasteurization at a temperature higher than 70° C. and cooling the pasteurized milk to a temperature lower than 20° C.

Step 2: Clarification and centrifugation of pasteurized milk to increase the concentration of milk fat higher than 10%.

Step 3: Variable thermal treatments depending on the types of fat and/or fermentation of milk fat, by adding lactic cultures, to develop the characteristic flavours of butter.

Step 4: Churning this milk fat to bind the fat globules and separate the milk proteins.

Step 5: Water wash of the agglomerated fat and/or elimination of milk proteins and sugars, in the form of butter whey.

Step 6: Variable speed churning, depending on the type of fat, until a stable emulsion is obtained.

Step 7: Addition of water and/or brine, then churning to adjust the fat percentage to 80%, the water percentage from 15 to 15% and salt percentage from 1.5 to 2.5%.

In the present invention, step 7 is replaced by new step 7 and the following:

Step 7 (new): Incorporation by churning of an emulsifier quantity ranging from 0% to 5.0%, preferably 1% and preferably of the distilled monoglyceride or distilled monoglyceride and diglyceride type, in liquid form at churning temperature and/or food colouring, preferably carotenoid.

Step 8: Emptying the contents of the churn into the pressure tank whose outlet is connected to a dispensing pump.

Step 9: Introduction of water and/or brine, with the help of a Bran Lubbe* type dispensing pump, to obtain a water percentage from 50 to 65%, a salt percentage from 0 to 3.0%, and in this way reduce the fat percentage to a percentage from 30–50% in the new mixture.
*Registered Trade Mark Step 10: Continuous emulsification of this new product, with the help of a modified mechanical emulsifier with circular rings of ordinary or double knives, preferably the Stephan* or Urschel* type, being able to resist pressures of 50 bars.
*Registered Trade Marks The STEPHAN and URSCHEL types of mechanical emulsifiers which contain at least one circular ring of knives are marked by having a passageway into, through and out of the machine for material being processed. At least one circular ring of knives is situated in the passageway. As material is flowed into, through and out of the machine, the material is comminuted by the circular ring or rings of knives not unlike a scissor like action.

Step 11: Continuous pressure of this new emulsion toward bulk packing equipment, individual paper packing equipment or all plastic containers or other types of containers.

2) Method for manufacturing continuous low calorie butter

The present invention starts with the known method for manufacturing continuous butter:

Step 1: Pasteurization at a temperature higher than 70° C. of pasteurized milk and cooling to a temperature below 20° C.

Step 2: Clarification and centrifugation of pasteurized milk to increase the concentration of milk fat higher than 10%.

Step 3: Various thermal treatments, depending on the type of fat and/or fermentation of milk fat, by adding lactic cultures, to develop the characteristic flavour of butter.

Step 4: Continuous churning of this milk fat to obtain agglomeration of fat globules and the separation of milk proteins and sugars, according to the following techniques:
  a) Introduction of milk fat into the continuous churn.
  b) Churning of the fat in the churning cylinder, at the appropriate speed depending on the type of fat.
  c) 1st water wash of the churned product.
  d) 1st mechanical working of the product with the help of an extruder.
  e) 2nd water wash of the churned product.
  f) 2nd mechanical working of the product.
  g) 3rd mechanical working of the extracted product.
  h) Injection of brine to adjust the water percentage to 16% and the salt percantage to 2.0%.
  i) Final working of the product to obtain regular butter.

In the present invention, step 4 is modified and the following staps are added:

Step 4 (new): Continuous churning of this milk fat to obtain agglomeration of the fat globules and separation of the milk proteins and sugars, depending on the following new techniques:
  a) Introduction of the milk fat into the continuous churn.
  b) Churning of the fat in the churn cylinder, at the appropriate speed, depending on the type of fat.
  c) 1st water wash of the churned product.
  d) 1st mechanical working of the product with the help of an extruder.
  e) 2nd water wash of the churned product.
  f) 2nd mechanical working of the product.
  g) 3rd mechanical working of the extracted product.
  h) Simultaneous introduction of a quantity of emulsifiers by a Bran Lubbe* type, multi-piston dispensing pump, at a level of 0% to 5.0%, preferably 1% of the final product and preferably of the distilled monoglyceride or distilled monoglycaride and diglycaride type, in liquid form at churning temperature and/or of a food colouring, preferably carotenoid, and introduction of a quantity of water and-/or brine by a Bran Lubbe* type, multi-piston dis- ·pensing pump to obtain a water percentage of 50–65% in the new mixture, a salt percentage of 0 to 3.0% and, in this way, to reduce the fat percentage to a percentage of 30–60%.
*Registered Trade Mark Step 5: Direct continuous emulsification, at the outlet of the churn. The modified mechanical emulsifier is of the circular ring type having ordinary or double knives, preferably of the Stephan* or Urschel* type, being able to resist pressures of 50 bars.
*Registered Trade Marks Step 6: Pushing this new emulsion from the outlet of the emulsifier to the pressure tank connected to bulk packing equipment, individual paper packing equipment or all plastic containers or other types of containers.

3) Method for manufacturing churned low calorie butter substitutes

The present invention starts with the known method for manufacturing churned butter substitutes:

Step 1: Solubilization in the aqueous phase of the following ingredients: salt, milk solids and/or preservatives (sodium benzoate and/or potassium sorbate).

Step 2: Solubilization in the lipid phase of the following ingredients: The emulsifiers, natural and/or artificial flavours, colouring and vitamins, at temperatures higher than 40° C.

In the present invention, the emulsifiers used are preferably the distilled monoglyceride or distilled mono-diglyceride and diglyceride type liquids at the temperature of the piece, and the proportioning is 0–5%, preferably 0.5%.

Step 3: Mixture with the help of mechanical agitators of 50–80% of the lipid phase and 20–50% of the aqueous phase. In the present invention, the quantities of the ingredients of steps 1 and 2, as well as the proportions used in step 3, are modified to obtain a new product having the following characteristics:
  % Water: 50%–65%, preferably higher than 58%.
  % Fat: 30%–50%, preferably lower than 40%.
  % Salt: 0% to 3.0%.
  % Solids: 0% to 2.8%, preferably 1%.
  % Emulsifiers: 0% to 5.0%, preferably 0.5%.

Step 4: Pumping and cooling of the proceding mixture at temperatures of 10° C.–25° C., with the help of Votator* "A" unit type or other surface-scraped exchangers, at variable rates of 1000–5000 Kg/hr.
*Registered Trade Mark Step 5: Mechanical working with the help of Votator* "B" unit beaters or "C" unit crystallizers or others. In the present invention, step 6 is a new step described as follows:

Step 6: Continuous mechanical emulsification of the mixture before or during or after cooling and/or before or during or after whipping and/or before or during or after crystallization. The emulsifier used is of a circular ring type, having ordinary or double knives, preferably, the Stephan* or Urschel* type.
*Registered Trade Mark Step 7: Continuous pushing of the new mixture toward bulk packing equipment, individual paper packing equipment, preferably the Sig* type, or all plastic containers, preferably the Acrapak* type or other containers, preferably the Multivac type.
*Registered Trade Marks 4) Method for manufacturing continuous low calorie butter substitutes The present invention starts with the known method for manufacturing continuous butter substitutes:

Step 1: Simultaneous proportioning of all the ingredients with the help of a Bran Lubbe* dispensing pump to obtain the noted composition percentages of churned low calorie butter substitutes.
*Registered Trade Mark In the present invention, the emulsifiers used are, preferably, distilled monoglyceride, or distilled mono and diglyceride, liquids at the temperature of the piece.

Moreover, the proportions used will give a new product having the following characteristics:

% Water: 50%–65%, preferably higher than 58%.
% Fat: 30%–50%, preferably lower than 40%.
% Salt: 0% to 3.0%.
% Solids: 0% to 2.8%, preferably 1%.
% Emulsifiers: 0% to 5.0%, preferably 0.6%.

Step 2: Static mixture of the continuous ingredients. In the present invention, all subsequent steps are identical to those described in steps 4, 5, 6 and 7 in the method for manufacturing churned low calorie butter substitutes.

The embodiments of the invention in which an exclusive property or privilege is claimed are defined as follows:

1. A process for manufacturing low calorie butter comprising providing a composition containing butterfat and water, said composition having a water content of from 50% to 65% by weight and a fat content of 30% to 50% by weight and introducing the composition into a mechanical emulsifier having at least one circular ring of knives, wherein comminution of the composition occurs as the composition passes through the mechanical emulsifier having at least one circular ring of knives to produce a stable low calorie butter containing said butterfat and said water in substantially solid form.

2. A process according to claim 1 wherein the water content is from 60% to 63%.

3. A process according to claim 1 wherein the fat content is from 35% to 39%.

4. A process according to claim 1 wherein the water content is from 60% to 63% and the fat content is from 35% to 39%.

5. A process according to claim 1 where up to 5% by weight of liquid emulsifier is added to said composition before introducing said composition into said mechanical emulsifier.

6. A process according to claim 5 wherein the liquid emulsifier comprises at least one compound selected from the group consisting of monoglycerides and diglycerides.

7. A process according to claim 6 wherein about 1% by weight of liquid emulsifier is added.

8. A process according to claim 1 wherein the composition also contains up to about 2% by weight of salt.

9. A process for manufacturing low calorie butter substitute comprising providing a composition containing solid fat and water, said composition having a water content of from 50% to 65% by weight and a fat content of from 30% to 50% by weight, and introducing the composition into a mechanical emulsifier having at least one circular ring of knives, wherein comminution of the composition occurs as the composition passes through the mechanical emulsifier having at least one circular ring of knives to produce a stable low calorie butter substitute containing said solid fat and said water in substantially solid form.

10. A process according to claim 9 wherein the water content is from 58% to 65%.

11. A process according to claim 9 wherein the fat content is from 30% to 40%.

12. A process according to claim 9 wherein the water content is from 58% to 65% and fat content is from 30% to 40%.

13. A process according to claim 9 wherein up to about 5% by weight of liquid emulsifier is added to said composition before introducing said composition into said mechanical emulsifer.

14. A process according to claim 13 wherein the liquid emulsifier comprises at least one compound selected from the group consisting of monoglycerides and diglycerides.

15. A process according to claim 14 wherein about 1% by weight of liquid emulsifier is added.

16. A process according to claim 9 wherein the composition also contains up to about 2% by weight of salt.

17. A process for manufacturing low calorie butter comprising providing a composition containing butterfat and water, said composition having a water content of from 50% to 65% by weight and a fat content of 30% to 50% by weight and introducing the composition into a mechanical emulsifier having at least one circular ring of knives, wherein comminution of the composition occurs as the composition passes through the mechanical emulsifier having at least one circular ring of knives to produce a stable low calorie butter containing said butterfat and said water in substantially solid form which can be packed at temperatures of 10°–20° C.

18. A process for manufacturing low calorie butter substitute comprising providing a composition containing solid fat and water, said composition having a water content of from 50% to 65% by weight and a fat content of from 30% to 50% by weight, and introducing the composition into a mechanical emulsifier having at least one circular ring of knives, wherein comminution of the composition occurs as the composition passes through the mechanical emulsifier having at least one circular ring of knives to produce a stable low calorie butter substitute containing said solid fat and said water in substantially solid form which can be packed at temperatures of 10°–20° C.

* * * * *